United States Patent [19]
Spreitzer

[11] 4,067,648
[45] Jan. 10, 1978

[54] MICROFICHE READER

[76] Inventor: Francis F. Spreitzer, 4415 W. 62nd St., Los Angeles, Calif. 90043

[21] Appl. No.: 716,939

[22] Filed: Aug. 23, 1976

[51] Int. Cl.² .............. G02B 7/04; G03B 23/08; G03B 21/14
[52] U.S. Cl. .............................. 353/27 R; 350/39; 350/254; 353/101
[58] Field of Search ............... 353/27 R, 27 A, 107; 350/38, 39, 254; 352/142; 354/286

[56] References Cited

U.S. PATENT DOCUMENTS

| 3,549,250 | 12/1970 | Pantenburg | 353/101 |
| 3,692,398 | 9/1972 | Strauss | 353/78 |
| 3,733,121 | 5/1973 | Smitzer | 353/27 R |
| 3,881,813 | 5/1975 | Maier et al. | 353/27 R |
| 3,967,890 | 7/1976 | Wells | 353/27 A |
| 3,997,258 | 12/1976 | Omi | 353/27 R |

Primary Examiner—Steven L. Stephan
Attorney, Agent, or Firm—Sellers and Brace

[57] ABSTRACT

A microfiche reader provided with a pair of lenses of different powers selectively and simultaneously shiftable into and out of alignment with the fiche projecting light beam. The lens in use rests by gravity on an X-Y fiche transport supported on a turn table. The lens shifting mechanism includes a device holding the lens in use firmly stationary despite both rotary and linear movement of the fiche transport. Simple linear movement of the lens shifting mechanism functions to elevate one lens while lowering the other gradually into contact with the fiche transport. The lens support assembly includes components for automatically adjusting the intensity of the light beam to provide the same lighting intensity on the image viewing surface for each lens. The lens support assembly is readily removable as a unit for servicing and the substitution of another assembly while the first is undergoing repair.

22 Claims, 5 Drawing Figures

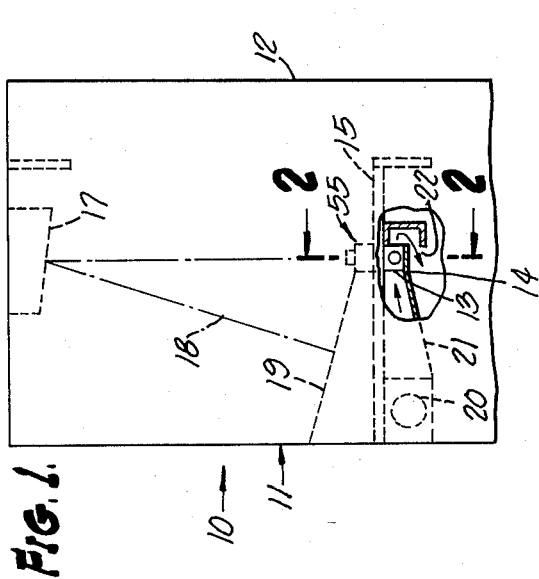
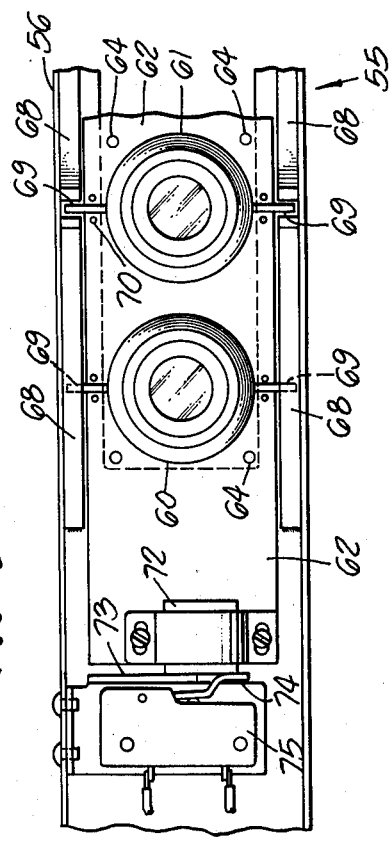
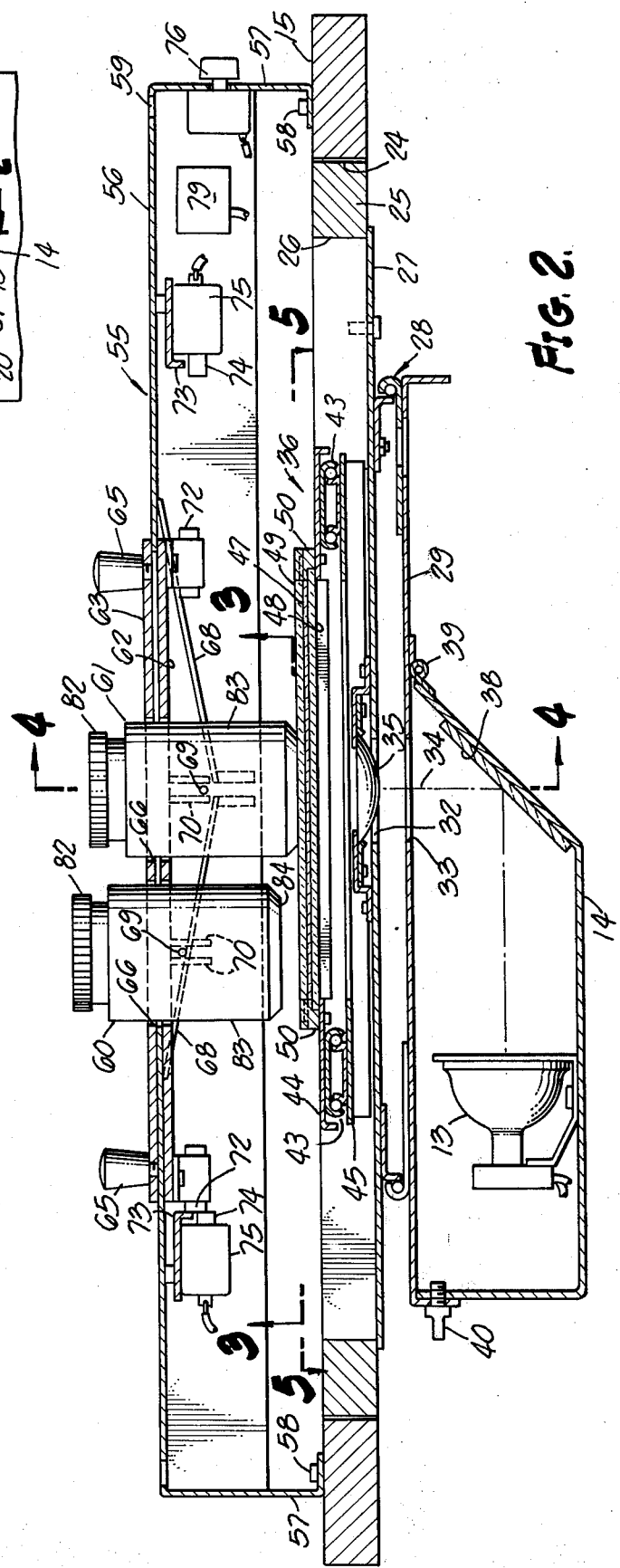

MICROFICHE READER

This invention relates to microfiche readers, and more particularly to an improved reader employing two lenses of different powers simultaneously substitutable one for the other in the projection light beam together with various auxiliaries including means for automatically varying the light beam intensity to maintain the lighting on the projection surface uniform.

BACKGROUND OF THE INVENTION

Many proposals have been made heretofore designed to project an enlarged film image onto a viewing surface and dividable generally into a first category for displaying images from strip film, and a second category for displaying images from a microfiche. The latter category presents far more difficult problems because of the substantially greater magnification required and, in consequence, very substantially higher precision equipment to provide a well illuminated high resolution image. Microfiche images are mounted in side by side relation on a library size card which is typically sandwiched between a pair of plates mounted on an S-Y type fiche transport. This transport is supported in a horizontal plane for movement in both directions crosswise of the optical axis. The projection lens must be firmly supported normal to the plane of the fiche. Desirably, the focal plane of this lens should be maintained precisely spaced parallel to the plane of the fiche within a tolerance of one mil, as the fiche is moved to align any fiche with the optical axis. These requirements are substantially more stringent than for strip film readers. The lens should not change position axially or laterally of the optical axis during adjustment of the fiche transport and, desirably, suitable means should be provided for changing the magnification of the image on the screen as well as means for maintaining the lighting intensity of the projected image constant as well as means for presenting the projected image in a convenient reading position whether arranged crosswise or longitudinally of the fiche card.

Prior film readers embody some but not all of these features. The 1949 British Pat. No. 616,874 discloses a reader having means supporting a film strip on a turn table but the reader lacks various other desirable features and capabilities.

Designers have proposed film readers employing projection lenses of different powers for both microfiche and film strips. Constructions of this type are shown in U.S. Pats. to Strauss No. 2,630,739, Ikezu No. 3,588,226, Bolgar No. 3,888,576, Feifer No. 3,792,226, and Peters No. 3,369,450. A reader of this type is also being marketed by Washington Scientific Industries, Inc., Long Lake, Minnesota. These various constructions employ a variety of mechanisms for substituting one lens for another of a different power. Strauss mounts his two lenses on a rotary turret head but lacks satisfactory and reliable means for maintaining the focal plane of either lens at the requisite precise distance from film supported in an X-Y film transport. In fact, such a transport is not even suggested by this patentee. Peters U.S. Pat. No. 3,369,450 had but a single stationary projection lens the power of which he endeavors to change by interposing an additional lens component. Ikezu U.S. Pat. No. 3,588,226 discloses a pair of projection lenses of different powers so designed that the focal plane of each is located at the same axial distance from the film image but he fails to show any means for supporting the two lens units and for substituting one lens for the other relative to an X-Y fiche transport. Feifer U.S. Pat. No. 3,792,923 proposes a reader having a pair of different power lenses rigidly supported on a bracket arm movable about the same vertical axis and shiftable to bring one into operating position relative to one fiche transport and the other into proper operating position relative to a second fiche transport. Neither lens can be used selectively with the same fiche transport. Bolgar U.S. Pat. No. 3,888,576 employs a pair of immovably supported lenses of different powers in combination with a linkage mechanism for adjusting a reflecting mirror system to modify the size of the displayed image.

Various expedients have also been proposed heretofore to maintain the projecting lens of a microfiche reader precisely spaced from and accurately normal to an X-Y fiche transport mechanism. Spring biasing means for maintaining a projection lens against the transport are proposed by Peters U.S. Pat. No. 3,634,005; Schutrum et al. U.S. Pat. No. 3,717,400; Peters U.S. Pat. No. 3,807,845 and Akajama U.S. Pat. No. 3,565,513. Two other patentees namely, Brownscombe U.S. Pat. No. 3,815,975 and Graef U.S. Pat. No. 3,860,333, propose accomplishing this same objective in reliance on gravity to hold the lens directly against the cover of an X-Y transport. In each instance only a single projecting lens is provided in both the gravity-actuated and the spring biased constructions. The Washington Scientific reader also utilizes gravity to support a pair of lenses of different powers on a fiche transport. However, the mechanism employed for this purpose utilizes a slider for the two lenses in combination with a T-shaped slot. The vertical T-stem of this slot is located in the plane of the optical axis and requires that the lens in use be manually lifted to the top of the T-stem portion of the slot following which the slider is shifted horizontally along the T-head portion of the slot to bring the second lens into alignment with the optical axis at which time the second lens must be manually lowered onto the film transport. This construction requires skillful manipulation to avoid risk of serious injury to the two lens components as well as to the glass plates of the fiche transport, and equally important, that the operator must manipulate the lens in a particular manner else it is impossible to substitute one for the other.

THE INVENTION

This invention provides a microfiche reader avoiding the shortcomings and disadvantages of these various prior readers and is characterized by its simplicity, ease of operation and the high fidelity of the projected image in both its normal and in its more magnified scale. The two projection lenses of different powers are quickly shiftable into and out of alignment with the optical axis and each is held firmly captive in floating position on a precision X-Y fiche transport. Short linear movement of the lens support automatically lowers one lens into floating support on the transport as the other lens is elevated to its retracted position. At the same time the intensity of the light beam is automatically adjusted to provide the same lighting intensity on the viewing surface for both lenses. Additionally, magnetic stop means operate to hold the lens in use firmly in projecting position despite both planar and rotary movement of the fiche transport. Rotary movement of the fiche transport through 360° is achieved by mounting the transport on a turntable having its axis aligned with the optical axis.

A pair of selectively usable projection lenses, the operating support therefor, together with the stops and automatic light intensity controls are housed within a unitary assembly readily removable by the novice for servicing or the substitution of another assembly.

It is therefore a primary object of the present invention to provide a unique and improved microfiche reader.

Another object of the invention is the provision of a microfiche reader having unique means for simultaneously and selectively shifting a pair of lenses of different powers into and out of alignment with the optical axis.

Another object of the invention is the provision of a microfiche reader for simultaneously elevating one lens while lowering a second into image projecting alignment with the optical axis of the reader.

Another object of the invention is the provision of a microfiche reader employing a pair of lenses of different powers selectively positionable in alignment with the optical axis while floatingly supported on the fiche transport together with means for holding that lens firmly in position while adjusting the fiche transport.

Another object of the invention is the provision of a microfiche reader utilizing a pair of lenses of different powers selectively shiftable into and out of alignment with the optical axis and including means for automatically maintaining the intensity of the projected image uniform irrespective of which lens is in use.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view of one preferred embodiment of the invention with portions broken away to show details of the cooling air passageway for the projection lamp;

FIG. 2 is a cross-sectional view on an enlarged scale taken along line 2—2 on FIG. 1;

FIG. 3 is a fragmentary view taken along line 3—3 on FIG. 2;

Figure 4:
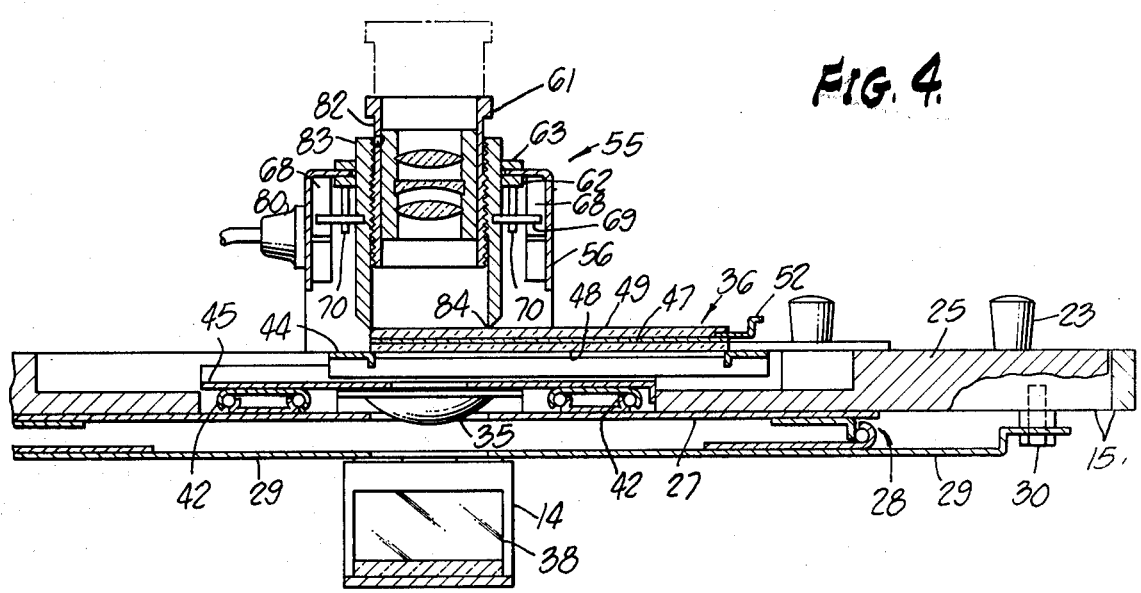
FIG. 4 is a transverse sectional view taken along line 4—4 on FIG. 2.

Referring initially more particularly to FIG. 1, there is shown a preferred embodiment of the invention microfiche reader, designated generally 10, mounted in a cabinet 11 enclosed except along its front face 12. The projection lamp 13 is mounted in a housing 14 beneath a horizontal counter or shelf 15 of cabinet 11 at a convenient reading height. The light beam from this lamp is directed upwardly through a projecting lens, in a manner to be described presently onto a downwardly facing mirror 17 mounted beneath the top of the cabinet in position to direct the light beam along the path indicated at 18 onto a forwardly inclined image viewing surface 19. This viewing surface is at a convenient viewing level for a seated viewer positioned in front of the open side 12 of the cabinet. A cooling air fan having an intake indicated at 20 directs cooling air through the housing 21, over the lamp 13, and thence downwardly and rearwardly through the air outlet passage 22.

Figure 5:
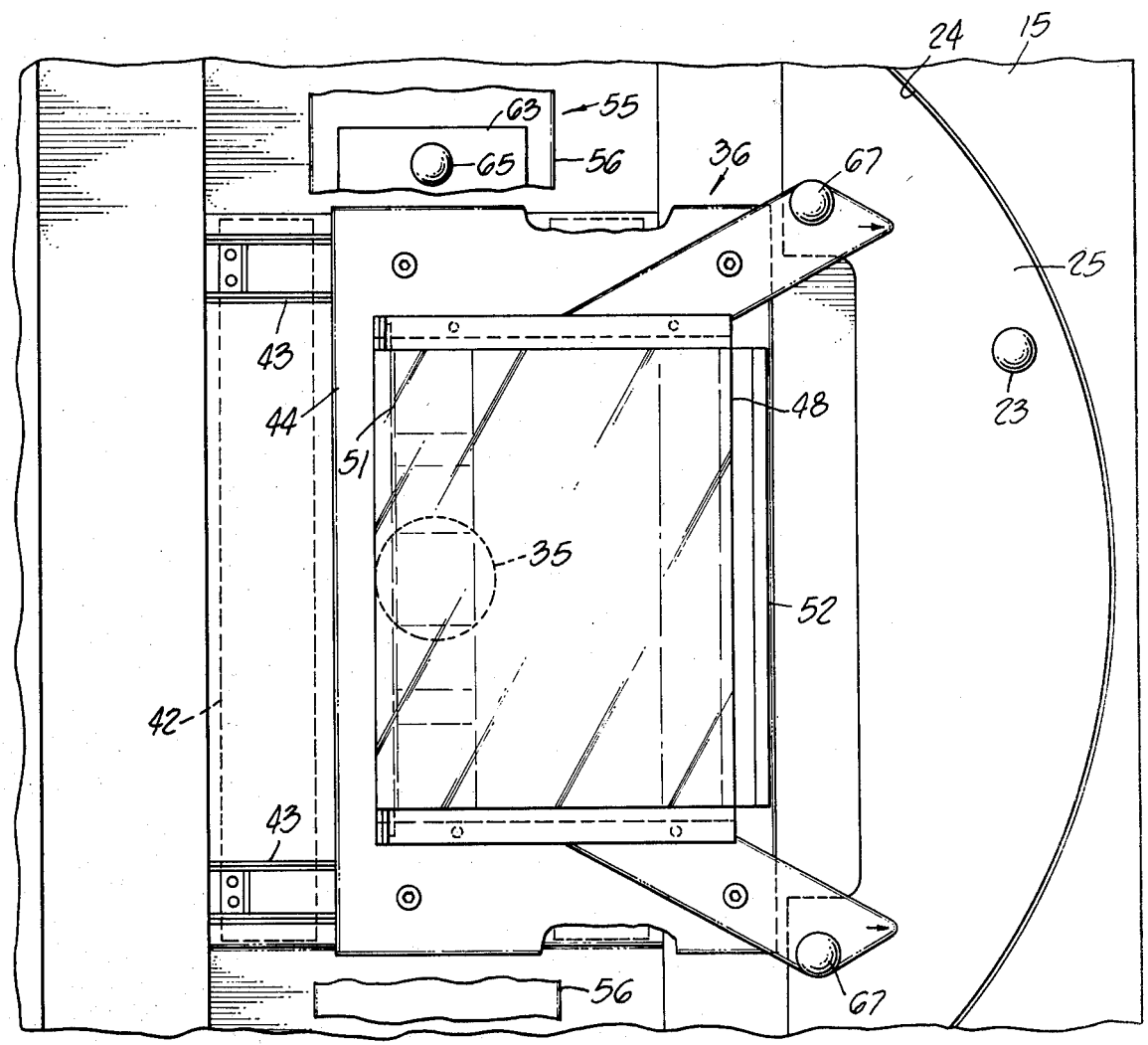
FIG. 5 is a fragmentary top plan view of the turn table and fiche transport taken generally along line 5—5 on FIG. 2.

As is best shown in FIGS. 2, 4 and 5, the central portion of the cabinet counter 15 is provided with a large circular opening 24 in which is mounted a turn table 25. The central portion of turn table 25 likewise is formed with a large opening 26 closed except for a central aperture by a plate 27 suitably secured to the underside of the turn table.

Fixed to the underside of plate 27 is a precision ball bearing 28 the outer raceway of which is fixed to a supporting bracket plate 29 firmly clamped at its corners by fasteners 30 (FIG. 4) to the underside of counter 15. Plate 27 and bracket 29 are provided with central openings 32, 33 (FIG. 2) which are in alignment with the vertical portion 34 of the optical axis. A condensing lens 35 is secured to plate 27 in alignment with this optical axis.

An X-Y fiche transport of any suitable construction well known in this art is secured to the upper side of plate 27 and is movable transversely of the optical axis to position any image of a fiche mounted therein in the light beam from lamp 13 directed upwardly therethrough by a mirror 38 (FIG. 2). This mirror is secured to an upwardly inclined end of housing 14. Fiche transport 36 has a lower set of precision trackways 42,42 (FIG. 4) extending lengthwise of counter 15 and a second set of precision upper trackways 43,43 (FIG. 5) extending crosswise of this counter. The upper set supports a rectangular frame-like carriage 44 and the lower set 43 supports a similar rectangular frame-like carriage 45 (FIG. 2). From the foregoing it will be understood that carriage 45 is movable to and fro crosswise of the counter whereas the upper carriage 44 is confined to similar movement lengthwise of the counter.

Referring to FIGS. 2 and 4 it is pointed out that a microfiche 47 is held flat and sandwiched between a lower transparent plate 48 and an upper transparent plate 49. Plate 48 is secured to carriage 44 by rabbeted keeper strips 50,50 (FIG. 2) whereas upper plate 49 can be pivoted upwardly about suitable stops extending along its rear longitudinal edge 51 (FIG. 5). This operation is facilitated by a finger tab 52 (FIG. 4) extending along and secured to the front edge of plate 49. Tilting the upper plate upwardly permits a fiche 47 to be inserted or removed from between the plates.

A unitary lens assembly housing, designated generally 55, has an elongated sheet metal housing 56 bridging turn table 25 and supported on legs 57 secured to counter 15 by screws 58. These screws are removable by inserting a wrenching tool downwardly through openings 59.

A pair of precision projection lenses 60,61 of different magnifying powers, as 24X and 60X, are slidably supported lengthwise of housing 56 for movement into and out of alignment with the optical axis 34 of the reader. The top wall of housing 56 is provided with a long rectangular opening supporting a slider for shifting the two lenses. The slider assembly comprises a pair of plates 62,63 secured together in spaced apart relation by fasteners 64 (FIG. 3) with the two plates in loose sliding engagement with the inner and outer surfaces of the top of housing 56. Knobs 65,65 secured to the opposite ends of the outer plate 63 (FIG. 2) provide convenient means enabling the operator to shift the lens slider plate 62,63 lengthwise of housing 55. The two lens assemblies 60,61 extend loosely through openings 66 in the two slider plates in order that the lens shifted into alignment with optical axis 34 is supported solely by the top plate of the fiche transport.

The means cooperating with slider plates 62,63 to move the lens units 60,61 vertically as they are shifted laterally will now be described. For this purpose upwardly converging ramps or camways 69 (FIGS. 2, 3, 4) are firmly secured to either interior sidewall of housing 56. Cooperating with these camways are pairs of pins 69 fixed to and projecting outwardly from the diametrical opposite sides of each of the lens units 60,61. These pins overlie the camways and ride upwardly or downwardly therealong as the slider is shifted lengthwise of housing 56. Cooperating with each of pins 69 are a pair of pins 70,70 having their upper ends fixed to the lower slider plate 62 and arranged closely adjacent the opposite sides of pin 69. As is made clear from FIG. 2, pins 69 are so arranged relative to the camways 68 that the lens units can be freely and floatingly supported by gravity on upper plate 49 of the fiche transport when either lens is in alignment with the optical axis 34. However, if the slider is shifted to lower the other lens unit, pins 69 of the lowermost lens will engage one pair of camways after a slight movement of the slider thereby to start elevating the lower lens as the other lens moves downwardly toward the fiche transport.

It is important that the lens in use be held firmly against movement while the fiche transport is being shifted to a different position. This is accomplished by permanent magnet means 72 one of which is secured to each of the opposite ends of the inner or lower slider plate 62 as shown in FIGS. 2 and 3. These permanent magnets are adjustably secured to plate 62 and abut a stop 73 of magnetic material fixed to housing 56.

Projection lamp 13 is de-energized while the slider is being moved to bring a different one of the lenses into operating position. However, once the lens approaches a floating position on the fiche transport one of the permanent magnets 72 engages the operating button 74 of a microswitch 75 mounted at each end of the slider path of travel. The microswitches 75 are connected in circuit with a rheostat 76 having its control knob mounted at one end of housing 56 as shown in FIG. 2 and this circuit also includes a fixed resistor connected in circuit with that one of the microswitches 75 controlling the current to lamp 13 when the lower powered one of lens 60,61 is in operating position. This resistor, not shown, is not in circuit with the lamp when the higher powered lens is positioned in the optical axis. The value of the resistor is chosen to provide the same lighting intensity on the viewing screen 19 when the low power lens is in use as when the high power lens is in use. If the user wishes to adjust this uniform light intensity he merely adjusts the control knob of rheostat 76.

It is pointed out that all electrical components within the lens assembly 55 are connected to a female socket 79 mounted in the wall of housing 56. A male connector 80 (FIG. 4) can be quickly disconnected from socket 79 when assembly 55 is removed for inspection or servicing.

The two lens units 60,61 are similar to one another and will be described by reference to FIG. 4. These units include the optical lens assembly proper 82 which is externally threaded to mate with the threads of a support tube 83. The knurled upper end of assembly 82 can be adjusted axially of tube 83 to locate the focal plane of the magnifying lenses precisely at the proper focal distance from fiche 47 when the lens unit 61 is floatingly supported on upper plate 49 of the fiche transport. In this connection it is pointed out that the lower end of tube 83 is beveled to provide a very narrow circular edge 84 which rests flush against the upper surface of plate 49. This edge must be precisely finished to support the lens components in accurate alignment with the optical axis 34.

The operation of the microfiche reader will be apparent from the foregoing detailed description of its components. A fiche 47 is preferably placed beneath the upper plate 49 of the fiche transport while the slider for the two lenses is in an intermediate position to support lenses 60,61 partially elevated along camways 68,68. This permits the operator to lift the upper plate about its rear edge without interference while the fiche is being inserted. After insertion of the fiche the operator then uses the slider control knobs 65 to bring the lens of the desired power into alignment with the optical axis. When the selected lens is floatingly supported on the upper plate, one or the other of the permanent magnets 72 will be engaged with the magnetic stop 73 to hold the slider firmly in place while at the same time maintaining microswitch 75 closed to energize lamp 13 at the appropriate intensity for the lens then resting on the fiche transport.

The reader is now in readiness for use and the operator may project any image of the fiche on the viewing screen simply by utilizing one or the other of the transport control knobs 67 (FIG. 5) to bring the desired image into alignment with the lens in use. If this image has its material arranged lengthwise of the page rather than crosswise, the operator uses the turn table control knob 23 to rotate the turn table 90° in the proper direction. If the user wishes to change the otherwise uniform lighting intensity, he merely operates the rheostat control knob 76.

If the user wishes to view the projected material in a differently magnified scale he merely moves the slider to its alternate position to place the other of the projection lenses in alignment with the optical axis. When in this position the associated one of magnets 72 will lock the slider in its alternate position and at the same time will operate the associated switch 75 to change the light intensity so that the lighting intensity on the viewing screen remains at the same value as when the other lens was in use. It is therefore clear that no action on the user's part is required other than to use one of the control knobs 67 to shift the lens slider to its new position.

While the particular microfiche reader herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. In a dual-power microfiche reader of the type in which a microfiche is sandwiched between two transparent plates of an X-Y fiche transport movable transversely of an image projecting light beam, that improvement which comprises: lens shifting means operatively interconnecting a pair of projection lenses of different powers operable to shift said lenses crosswise of said light beam to bring either selected one of said lenses into alignment with the optical axis of said light beam and for automatically resting said selected lens flush against the adjacent one of said transport plates and for moving the non-selected lens to a position to one side of said light beam and out of contact with said one transparent plate.

2. A microfiche reader as defined in claim 1 characterized in that said fiche transport is supported generally horizontally and said pair of lenses being supported thereabove, and the weight of said lenses being utilized to hold the selected one of said lenses flush against said one transport plate with the optical axis thereof normal to the plane of a fiche.

3. A microfiche reader as defined in claim 1 characterized in the provision of a manually manipulatable control for moving said lens shifting means in opposite directions to automatically shift said pair of lenses to rest either selected one thereof against the adjacent one of said transport plates.

4. A microfiche reader as defined in claim 1 characterized in that said lens shifting means includes means for progressively and simultaneously moving said pair of lenses in opposite directions axially thereof while shifting the same laterally of said light beam.

5. A microfiche reader as defined in claim 4 characterized in that means for moving said lenses in different directions includes camming means for lifting one of said lens while lowering the other toward said transparent plate.

6. A microfiche reader as defined in claim 1 characterized in the provision of means for automatically regulating the intensity of said light beam to a different intensity depending upon which one of said lenses is being moved into alignment with said beam.

7. A microfiche reader as defined in claim 6 characterized in the provision of means for releasably holding a selected one of said pair of lenses aligned with the axis of said light beam and substantially against movement while said X-Y transport is being moved to a different position.

8. A microfiche reader as defined in claim 7 characterized in that said holding means includes magnetic means.

9. A microfiche reader as defined in claim 1 characterized in that said fiche transport means is mounted on rotary means rotatable through at least 90° about a generally upright axis.

10. A microfiche reader as defined in claim 1 characterized in that said fiche transport means is supported for rotation about a vertical axis substantially coincident with the optical axis of the image projecting light beam along the portion thereof passing through said fiche and one of said pair of lens.

11. A microfiche reader as defined in claim 10 characterized in the provision of means for supporting said pair of lenses on common stationary support means and independently of said rotary support means for said fiche transport means.

12. A microfiche reader as defined in claim 1 characterized in the provision of means for automatically maintaining the intensity of the projected fiche image substantially uniform on a viewing screen irrespective of which one of said lenses is in projecting position.

13. A microfiche reader having a turntable supported for rotation about a generally vertical axis coinciding with the axis of an image projecting light beam port therethrough; X-Y fiche transport means mounted on said turntable, for rotation therewith a pair of image projecting lenses of different powers and means interconnecting said pair of lenses and operable to shift said lenses in unison to position either one thereof in a non-operating position to one side of said light beam port and the other one thereof in alignment with said light beam port and resting directly on said X-Y fiche transport means with the focal plane thereof parallel to and precisely spaced from a fiche positioned in said X-Y fiche transport means.

14. A microfiche reader as defined in claim 13 characterized in the provision of means for maintaining the axis of the lens positioned in the projection light beam normal to the plane of the fiche in all rotary adjustments of said turntable.

15. A microfiche reader as defined in claim 13 characterized in that the lens positioned in alignment with the projection light beam rests against a transparent fiche cover plate carried by said fiche X-Y transport thereby to maintain the focal plane of said lens precisely parallel to and spaced from said fiche in all stationary positions of said turntable.

16. In a microfiche reader of the type having an X-Y fiche transport mounted crosswise of the optical axis of the reader and including projection lamp means at on end of said optical axis and an image display screen at the other end of said optical axis, that improvement which comprises: a unitary sub-assembly movably supporting a pair of projection lenses of different powers for simultaneous movement to position either of said lens in alignment with said optical axis and including a lamp intensity control means for automatically maintaining the light intensity of the projected fiche image on the screen uniform irrespective of which one of said lens is positioned in the optical axis.

17. A microfiche reader as defined in claim 16 characterized in the provision of readily disconnectable means releasably securing said unitary sub-assembly to said reader whereby said sub-assembly and lamp intensity control means may be detached as a unit for inspection and servicing.

18. A microfiche reader as defined in claim 17 characterized in the provision of manually adjustable means for varying the intensity of the light from said projection lamp independently of said means for maintaining the light intensity while shifting said lens between the respective operating positions thereof.

19. A dual power lens mounting assembly for a microfiche reader comprising: an elongated housing having upwardly diverging camways, slide means shiftable lengthwise of said housing having a pair of fiche projecting lenses of different powers projecting loosely therethrough and spaced apart longitudinally of said housing, support means projecting from the opposite sides of said lens and crosswise of said housing into positions engageable with said camways thereby to lower one of said lens into the fiche projecting position thereof while elevating the other lens out of its fiche projecting position as both lenses are shifted simultaneously lengthwise of said housing, and means in said housing to limit the shifting movement of said slide means in each direction when the lower one of said lenses is in the fiche projecting position thereof.

20. A lens mounting assembly as defined in claim 19 characterized in the provision of means for holding the lens in its fiche projecting position firmly against movement out of that position until said slide means is deliberately shifted bodily toward the alternate position thereof.

21. In a microfiche reader of the type having means for projecting an image projecting light beam onto an image viewing surface, that improvement which comprises: a horizontally supported turntable having a light projecting port through the center thereof, an X-Y fiche transport mounted on said turntable transversely of said light projecting port having a pair of transparent plates adapted to have a fiche sandwiched therebetween, means bridging said turntable and slidably supporting a pair of lenses of different power and including means for simultaneously shifting said lens crosswise of said X-Y transport while gradually lifting one lens and gradually lowering the other lens into contact with said X-Y transport and into alignment with said image projecting light beams, and means to hold said other lens firmly against movement relative to said image projecting light beams while said turntable and/or said X-Y transport are being adjusted to any position thereof.

22. a microfiche reader as defined in claim 21 characterized in the provision of means for adjusting the intensity of said light beam automatically to maintain the same light intensity on said image viewing surface when one of said lens is substituted for the other thereof in said light beam.

* * * * *